United States Patent [19]
Suzuki

[11] 3,747,485
[45] July 24, 1973

[54] CAMERA CONTROLS FOR COUPLED AND NON-COUPLED OBJECTIVES

[75] Inventor: Minoru Suzuki, Tokyo, Japan

[73] Assignee: Asahi Kogaku Kogyo Kabushiki Kaisha, Tokyo-to, Japan

[22] Filed: Aug. 16, 1972

[21] Appl. No.: 281,024

[30] Foreign Application Priority Data
Sept. 9, 1971 Japan.............................. 46/69874

[52] U.S. Cl. ............... 95/10 CT, 95/42, 95/53 EB, 95/64 B
[51] Int. Cl...... G03b 7/08, G03b 7/20, G03b 13/22
[58] Field of Search................ 95/10 CT, 64 B, 42, 95/53 EB

[56] References Cited
UNITED STATES PATENTS

| | | | |
|---|---|---|---|
| 3,683,765 | 8/1972 | Yukiio Iura.......................... | 95/42 X |
| 3,678,823 | 7/1972 | Takayoshi Sato................... | 95/42 X |
| 3,650,193 | 3/1972 | Munetaka Shimizu........ | 95/10 CT X |
| 3,703,136 | 11/1972 | Schwarz................................. | 95/42 |
| 3,563,153 | 2/1971 | Koichiro Watanabe............ | 95/64 B |

*Primary Examiner*—Joseph F. Peters, Jr.
*Attorney*—Harold D. Steinbert et al.

[57] ABSTRACT

Controls for cameras adpated to use coupled and non-coupled objectives interchangeably. An electrical circuit is provided for utilizing a variable resistor with a coupled objective and direct light measurement through a stopped-down diaphragm with a non-coupled objective, these different operations being determined by a manually operable switch. In the event that a non-coupled objective is mounted on the camera and this latter manually operable switch is not positioned to directly measure light through the stopped-down diaphragm, the exposure time is the equivalent of a bulb exposure, lasting only until the operator releases a shutter-tripping member.

7 Claims, 7 Drawing Figures

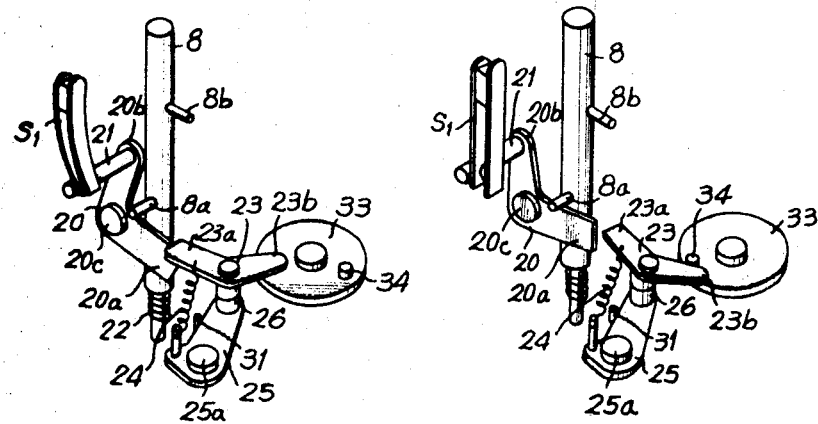
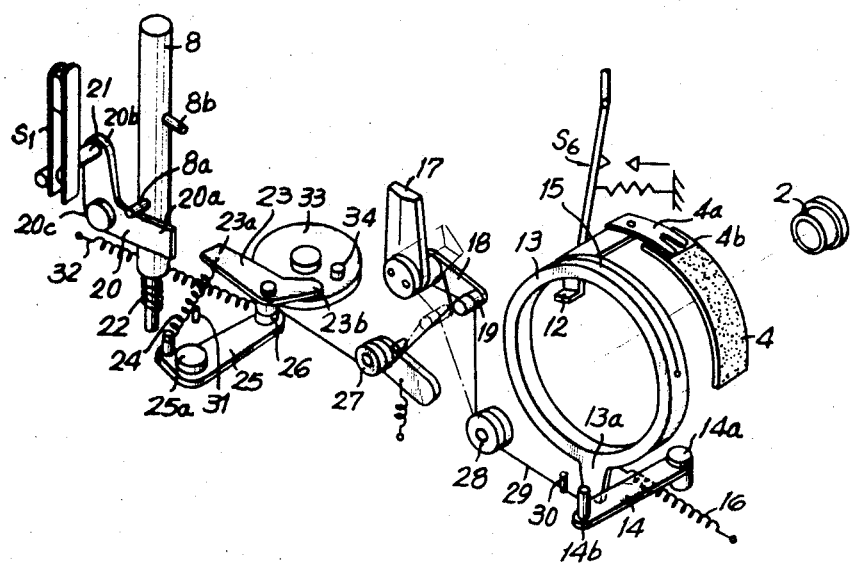

3,747,485

CAMERA CONTROLS FOR COUPLED AND NON-COUPLED OBJECTIVES

BACKGROUND OF THE INVENTION

The present invention relates to cameras.

In particular, the present invention relates to single lens reflex cameras which are capable of automatically determining the exposure time and which are capable of using interchangeable objectives.

Cameras of this type are conventionally provided with internal photosensitive elements for measuring light after it has passed through the objective which is mounted on the camera. The photosensitive element is connected to an electrical circuit which determines the exposure time automatically. When a coupled type of objective is used with the camera, this objective automatically sets a variable resistor of the circuit to provide a resistance value corresponding to the selected size of the exposure aperture. However, when a non-coupled objective is used with such a camera, the variable resistor is not automatically set. With this latter type of objective it is necessary first to stop the objective down to the selected aperture and then to trip the shutter so that the exposure is automatically made with direct measurement of light which passes through the stop-down diaphragm. The electrical circuit of the camera includes a switch set by the operator either in a fully-open diaphragm position for operating with a coupled objective or in a stopped-down diaphragm position for operating with a non-coupled objective. In the event that a non-coupled objective is used while this latter switch is set in the fully-open diaphragm position, because the operator has neglected to displace it to the stopped-down diaphragm position, an improper exposure is made, and with conventional cameras a time exposure is made under these conditions.

Thus, it is conventional to operate cameras of the above type both with coupled and non-coupled objectives. The non-coupled objectives are incapable of automatically placing the electrical circuitry in a position which will take into account the selected exposure aperture. For example cameras of the above type may have attached thereto an objective utilizing an accessory such as a close-range photography ring, and with such an arrangement there is no automatic setting of the variable resistor referred to above in accordance with the preselected diaphragm setting. It is therefore essential when using a non-coupled objective to place the circuit in a condition where it will be capable of operating with light measured through the stop-down diaphragm. Thus, with cameras of this type a proper exposure will not be obtained with a non-coupled objective unless the latter happens to be set at the position for the largest aperture.

With a single lens reflex camera which measures light which has already passed through the camera objective, the object brightness before the diaphragm is stopped down to the selected aperture and before the mirror swings up is sensed by a light-receiving element situated in the camera behind the objective. The resulting electrical signal is temporarily memorized. When an exposure is to be made the diaphragm is automatically stopped down to the preselected setting and the mirror swings up, whereupon the shutter is actuated and a proper exposure is made by way of the exposure-time determining circuit on the basis of the memorized signal, as well as on the basis of the signals introduced in accordance with the selected aperture of the diaphragm and the speed of the film which is used in the camera.

However, a non-coupled type of objective cannot introduce into the electrical circuitry the factor of the preselected aperture setting. In this case it is necessary to set the circuit so as to be capable of operating with light measured through the diaphragm after the latter has been stopped down. For example, the preselected aperture setting may be F5.6, while the fully open diaphragm setting may be F2. It is conventional for the operator to look through the viewfinder at the object to be photographed while the diaphragm is set at its largest aperture, and if light measurement is made while the aperture remains at its largest setting and then the diaphragm is automatically stopped down to the preselected setting, it is clear that there will be an underexposure, in this case a three-stage underexposure resulting from light measurement with a setting of F2 and stopping down of the objective to F5.6 during the actual exposure. If indeed the diaphragm is set at the largest aperture F2 and this is the aperture selected for exposure, then in this case it will be possible to make a proper exposure even with a non-coupled type of objective. Thus, in those cases where the operator neglects to stop the diaphragm down to the preselected setting before actuating a shutter-tripping plunger with a non-coupled objective which will be stopped down to the preselected aperture after shutter-tripping operations have been initiated, it is clear that light measurement is made with a setting of the diaphragm which is larger than the actual setting during actual exposure, resulting in underexposures.

It is possible to properly use non-coupled objectives with cameras of the above type if the camera is initially set so as to operate with such an objective. Thus, when a coupled type of objective is removed from the camera and replaced by a non-coupled objective of any type, it is necessary to provide a functional change-over in the circuitry from fully-open diaphragm light measurement to non-connection light measurement where the signal is achieved by measurement of light through the stop-down diaphragm. Under these conditions the operator may close the circuitry to start the light-measurement operation, and there will appear an indication warning of the non-connection of the variable resistor which is operated by a coupled-type of objective. If the operator should continue under these conditions to trip the shutter, the non-connection circuitry acts in such a way as to make a time exposure, thereby warning the user that an improper exposure has been made. Of course, it is possible for the operator to change the circuitry over to operate properly with the stop-down diaphragm light measurement by means of a manually operable stop-down diaphragm change-over member so as to carry out exposure with the stop-down diaphragm in a proper manner.

With cameras having electrical circuitry of the above type, an arrangement is made to spare the operator the trouble of maintaining the shutter-tripping plunger depressed for a long period of time as, for example, when an exposure is made under low-light conditions such as exposures made during the night. In this case an automatic structure operates to maintain the current-source main switch closed until a proper exposure time has elapsed. Thus, with this type of construction once the shutter-release button is depressed, the main switch for energizing the electrical circuitry will be maintained closed in response to operation of the shutter-tripping mechanism until the proper exposure time has elapsed, even though the operator has already released the plunger for return to its starting position. Under these conditions if an exposure is erroneously made a non-coupled type of diaphragm where proper precautions have not been taken to expose the film with light measured through the stop-down diaphragm, then there is a disadvantage with conventional cameras in that as a result a time exposure is made, resulting in undesirable waste of battery power.

SUMMARY OF THE INVENTION

It is accordingly a primary object of the present invention to provide a camera of the above general type which will avoid the above drawbacks.

Thus, it is a primary object of the present invention to provide a camera capable of interchangeably using objectives of different types and at the same time capable of minimizing possible losses resulting from the fact that the operator neglects to set the camera to operate in a manner which is consistent with the type of objective which is mounted on the camera.

In particular, it is an object of the invention to provide a camera capable of eliminating the drawbacks inherent in conventional cameras which automatically provide time exposures in the event that the camera is set to operate with a coupled objective of the fully-open diaphragm type and in fact has mounted thereon a non-coupled objective which is incapable of automatically setting a variable resistor of an electric circuit to compensate for the light measurement with a fully open diaphragm.

A more specific object of the invention is to provide a construction according to which the duration of exposure will equal that of a bulb exposure in the event that the camera is set to operate with a coupled objective when in fact a non-coupled objective is mounted thereon.

A further object of the invention is to provide a camera which will avoid erroneous operation of the automatic structure of the camera in a situation which is the reverse of that referred to above in that a fully open type of coupled objective is mounted on the camera and the camera is set to operate with a non-coupled type of automatic objective.

In addition, it is an object of the invention to provide structure capable of achieving the above results in a simple highly effective manner which will not undesirably increase the cost of the camera and which also will not undesirably increase the size of the camera or the number of components which must be incorporated into the camera.

In accordance with the invention the single lens reflex camera is adapted to use interchangeable objectives both of the coupled and of the non-coupled type. The camera has a photosensitive means for measuring light after the light has travelled through a selected objective which is mounted on the camera. A manually operable shutter-tripping means is movable by the operator from a starting position to a shutter-tripping position and automatically returns to its starting position when released by the operator. An electrical circuit means is electrically connected with the photosensitive means for automatically determining the exposure time, this electrical circuit means includes a main switch means having with respect to the shutter-tripping means a position which closes the main switch means and thus the electrical circuit means for energizing the latter upon movement of the shutter-tripping means away from its starting position toward its shutter-tripping position. A releasable retaining means coacts with the main switch means for retaining the latter in its closed position after the shutter-tripping means is released for return to its starting position until the shutter closes, this releasable retaining means responding automatically to closing of the shutter for releasing the main switch means for return to its open position. The electrical circuit means further includes a variable resistor means which coacts with a coupled objective to introduce into the electrical circuit means a resistance value in accordance with a preselected diaphragm setting when a coupled objective is mounted on the camera. A manually operable switch means forms part of the electrical circuit means and has a fully-open diaphragm position connecting the variable resistor means into the electrical circuit means in series with the photosensitive means and a stop-down diaphragm position connecting the photosensitive means into the electrical circuit means while disconnecting the variable resistor means from the electrical circuit means, and a control means is provided for automatically opening the main switch means to terminate operation of the electrical circuit means upon release of the shutter-tripping means for return to its starting position in the event that the manually operable switch means has not been displaced to its stopped-down diaphragm position when a non-coupled objective is mounted on the camera, so that in this latter event the equivalent of a bulb exposure is made.

BRIEF DESCRIPTION OF DRAWINGS

The invention is illustrated by way of example in the accompanying drawings which form part of this application and in which:

FIG. 3 shows in a perspective view part of the structure of FIG. 2 in a position where a releasable retaining means retains a main switch means in its closed position;

FIG. 4 is a perspective illustration of the structure of FIG. 3 after closing of the shutter brings about release of the main switch means for return to its open position;

FIG. 5 shows part of the structure of FIG. 2 in the position it takes when a releasable retaining means is retracted to a retracted position having no effect on the main switch means;

DESCRIPTION OF PREFERRED EMBODIMENTS

Figure 1:
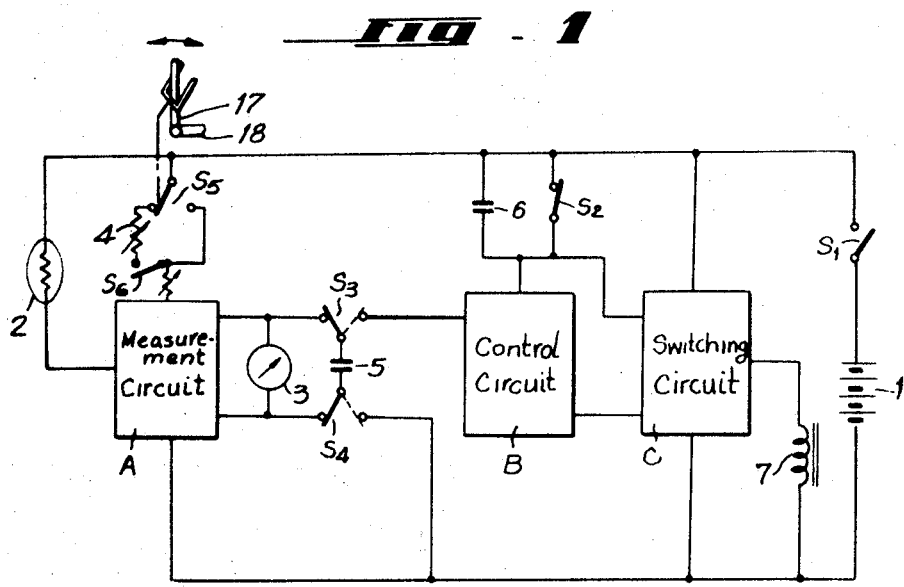
FIG. 1 is a schematic block and wiring diagram of circuitry of the invention.

Referring to FIG. 1, the circuitry illustrated therein is for the most part conventional. Thus, FIG. 1 shows a source of current 1 connected to the illustrated electrical circuit means which includes a photosensitive means 2 in the form of a light-receiving component situated in the camera behind the objective to respond to light after the light has travelled through the objective in order to measure the intensity of the light and provide a corresponding electrical quantity. The electrical circuit means of FIG. 1 includes an indicating meter 3 connected in parallel with a capacitor 5 when the switches S3 and S4 have the solid line position indicated in FIG. 1. Also, the circuitry includes a variable resistor means 4 which is provided to introduce into the circuit the factor of the preselected diaphragm. The capacitor 5 is a memory or storage capacitor. The circuitry includes a timing circuit which has as part thereof a timing capacitor 6. Also, the electrical circuit means of FIG. 1 includes an electromagnet means 7 which when energized retains the shutter in its open position and when deenergized releases the trailing curtain of the shutter to close the shutter in a well known manner. A main switch means is formed by the current source switch S1, and the circuit means also includes the timing switch S2 which when closed bypasses the timing capacitor 6 and which when opened renders the timing capacitor 6 operative. The switches S3 and S4 operate together to change over from the solid line position of FIG. 1 where the memory capacitor 5 is charged to the dotted line position of FIG. 1 where the charge memorized by and stored in the capacitor 5 is used for influencing the timing portion of the electrical circuit means in order to determine in a well known manner the exposure time. These change-over switches S3 and S4 are arranged so as to be operated after closure of the main switch means S1 in driving connection with, for example, the initial part of the depression movement of the shutter-tripping means, so that just before the shutter is released to open and make an exposure the memory capacitor 5 is separated from the measurement circuit A and connected with the control circuit B. A change-over switch S5 forms part of a manually operable switch means of the invention for changing over from the illustrated fully-open diaphragm position to a stopped-down diaphragm position where the switch S5 no longer connects the variable resistor 4 in series with the photosensitive means 2 and instead connects the photosensitive means 2 directly into the circuit while disconnecting the variable resistor means therefrom. Thus, when the switch S5 is in the position shown in FIG. 1, the variable resistor means 4 is operative and a fully-open diaphragm light measurement operation can be carried out with a coupled objective.

The electrical circuit means further includes a switch S6 connected in series with the variable resistor means 4 and arranged so as to be opened when a fully-open diaphragm type of coupled objective is removed from the camera, so that in this way the operator can receive a warning that the exposure meter 3 is not connected into the circuit.

Figure 2:
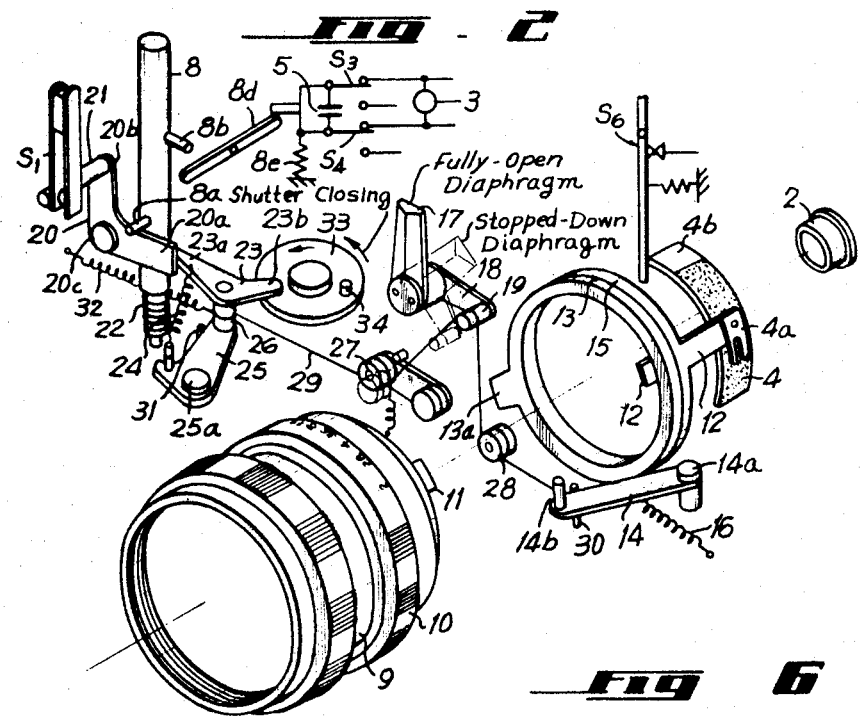
FIG. 2 is a schematic partly exploded perspective illustration of details of one embodiment of the invention.

Referring to FIG. 2, it will be seen that the camera includes a shutter-tripping means formed by an elongated rod 8 which is connected to the shutter button and which is depressed by the operator so as to move downwardly from the starting position illustrated in FIG. 2 toward a tripping position where the shutter is tripped so as to assume its open position in a well known manner. The rod 8 of the shutter-tripping means fixedly carries a radially extending pin 8a which during downward movement of the rod 8 brings about automatic closing of the main switch means S1. Thus, as may be seen from FIG. 2, the pin 8a is located directly over an arm 20a of a bell crank 20 supported for swinging movement on a pivot pin 20c. The second arm 20b of the bell crank carries a pin 21 made of an insulating material and engaging the left leaf of the switch S1 shown at the left of FIG. 2. Therefore when the operator moves the rod 8 downwardly the lever 20 swings in a clockwise direction to move the pin 21 to the right and thus close the main switch means S1.

With this closing of the main switch means S1 the electrical circuit means of FIG. 1 is energized, and the photosensitive means 2 is rendered operative to respond to the intensity of the light which has travelled through the objective, this photosensitive means 2 together with the measurement circuit A which is conventional providing an output voltage which is proportional to the APEX number of object brightness, this voltage being developed at one pole of the memory capacitor 5. At the same time, a second output voltage which is an electrically transformed value corresponding to the APEX representation of exposure conditions other than object brightness, namely F value and film speed, is developed at the other pole or terminal of the memory capacitor 5. As a result, the voltage across the memory capacitor 5 has a value determined in accordance with the exposure conditions of object brightness, F-value, and film speed. The meter 3 which is connected in parallel with the memory capacitor 5 has an exposure time scale according to APEX values, so that the meter 3 which is visible to the operator provides an indication of the exposure time which will be produced under the particular photographing conditions. In other words the meter 3 will indicate the exposure time which will be provided by the camera in accordance with the intensity of the light, the selected exposure aperture, and the film speed.

As was pointed out above, during the first or initial part of the downward movement of the shutter-tripping means 8, the main switch means S1 is closed. During an intermediate part of the downward movement of the shutter-tripping means 8 toward its shutter-tripping position, before actual tripping of the shutter, the switches S3 and S4 are changed over from their connection to the circuit A into their connection to the circuit B. Thus, FIG. 2 shows schematically how a spring 8e normally maintains the switches S3 and S4 in th solid line position of FIG. 1 while a lever 8d is acted upon by the pin 8b during the intermediate part of the downward movement of the rod 8 in order to change the switches S3 and S4 over into their connection with the control circuit B. In this way the memory capacitor 5 is inserted into a retaining circuit which retains the charge which corresponds to the voltage across the capacitor 5. The control circuit B which has a high input resistance retaining circuit controls the current which charges the timing capacitor 6 in accordance with the voltage across the memory capacitor 5.

During the final part of the downward movement of the shutter-tripping means 8 from its starting position toward its shutter-tripping position, the pin 8b brings about in a known way swinging up of the mirror of the reflex camera, automatic stopping-down of the diaphragm, also in a well manner, and immediately thereafter opening of the shutter with simultaneous opening of the timing switch S2, this latter operation also taking place in a well known manner which does not form part of the present invention.

The time during which the capacitor 6 is charged upon opening of the switch S2 determines the exposure time in accordance with the charging current controlled by the control circuit B, and when the charge at the timing capacitor 6 reaches a given value the voltage across the capacitor 6 will reach a corresponding value automatically bringing about operation of the switching circuit C, which may be a form of Schmitt circuit, so as to deenergize the electromagnet 7, thereby releasing the trailing curtain of the shutter so that the shutter immediately closes and the exposure is terminated.

Upon closing of the shutter the switch S1 opens, the mirror swings back down to its position for reflecting light from the objective to the viewfinder, and the diaphragm automatically returns to its fully open position, all of these operations taking place in a well known manner, so that in this way a complete cycle of photographing operations is completed.

Upon removal of a fully-open diaphragm type of coupled objective from the camera, the switch S6 automatically opens, in the manner described in greater detail below, so that one of the poles or terminals of the memory capacitor 5 is not charged in accordance with an output voltage representing as an electrical quantity exposure factors other than object brightness, such as the factor of the selected diaphragm aperture and the film speed, and at this time the indicating meter 3 indicates a non-connection, thus letting the operator know that the camera must be operated in the manner required when a non-coupled objective is mounted thereon. Under these conditions the switching circuit C does not operate so that current will continue to flow through the winding of the electromagnet means 7. Therefore under these conditions shutter closing action is not automatically initiated after a lapse of time corresponding to a proper exposure time, and instead the shutter is operated according to a time exposure.

Measurement of the light is carried out with a stopped-down diaphragm by changing over the switch means S5 to the stopped-down diaphragm side where the switch S5 no longer connects the variable resistor 4 into the circuit and serves at this time to connect the photosensitive means 2 directly into the circuit. Under these conditions the charge stored at the memory capacitor 5 is determined by way of the setting of the diaphragm by the diaphragm ring of the objective, and shutter control operation is then carried out in the same way as described above.

FIG. 2 schematically illustrates a fully-open diaphragm type of coupled objective 9 capable of being mounted on the camera. This objective 9 has an aperture selecting ring 10 which in the position illustrated in FIG. 2 has been turned so as to select an aperture of F8. The aperture-selecting ring 10 has a coupling projection 11 through which it is capable of operating a first transmission means 13 in order to bring about automatic setting of the variable resistor means 4. This first transmission means 13 includes the illustrated ring 13 having a coupling projection 12 engaged by the coupling projection 11 so that rotary movement of the ring 10 is transmitted to the ring 13 for turning the latter around the optical axis, this ring 13 of the first motion-transmitting means being supported for rotary movement about the optical axis in any suitable way. The elongated projection 12 normally engages the projection 11 at the front end of the projection 12 while the rear end thereof carries a brush 4a of the variable resistor means 4. This variable resistor means has at its left end, as viewed in FIG. 2, an insulating or electrically non-conductive portion 4b. The arrangement is such that when the brush 4a engages the insulating portion 4b, the switch S6 of FIG. 1 is opened so as to establish a non-connection light measurement circuit. Thus, referring to FIG. 5, there is schematically illustrated therein the switch S6 which is normally urged by a spring to its closed position, this switch having a part located in the path of movement of the projection 12 so that when the ring 13 turns to the position shown in FIG. 5 the switch S6 assumes the open position shown in FIG. 5.

The first transmission means formed by the ring 13 is urged to a rest position in a counterclockwise direction from the position of FIG. 2 into the rest position illustrated in FIG. 5 by a spring means 16 connected to a wire 15 which extends around and is fixed to the ring 13. Therefore when the projection 12 is not acted upon by the projection 11 of a coupled type of objective 9, the spring means 16 will return the first transmission means 13 to the rest position which is shown in FIG. 5.

This first transmission means includes a lug 13a of the ring 13, and this lug 13a engages a swingable lever 14 of a second transmission means for swinging the lever 14 from the position of FIG. 2 into the position of FIG. 5 when the first transmission means returns to the rest position shown in FIG. 5. Thus, it will be seen that tle swingable lever 14 of th second transmission means is supported for swinging movement on a stationary pivot pin 14a and has its clockwise rotary movement limited by a stationary stop member 30.

The second transmission means includes an elongated wire 29 connected at one end to a pin 14b which is fixed to the swing lever 14.

The manually operable switch means S5 includes a lever 17 fixed to a pin which is supported for rotary movement about a horizontal axis parallel to the optical axis, this lever 17 being accessible to the operator. The lever 17 is fixed to a second lever 18 which extends perpendicularly with respect to the lever 17 and which carries a roller 19 which is parallel to the turning axis of the levers 17, 18. The lever means formed by the assembly 17, 18 is operatively connected with th switch S5 in the manner shown schematically in FIG. 1, so that when the lever 17 is in the solid fully-open diaphragm position shown in FIG. 2 the switch S5 is connected with the variable resistor means 4, while when the lever 17 is turned by the operator in a clockwise direction, as viewed in FIGS. 1,2, and 5, to the phantom-line position, the manually operable switch means is placed in its stopped-down diaphragm position where the switch S5 is no longer connected with the variable resistor means 4 but instead connects the photosensitive means 2 directly into the circuit while disconnecting the variable resistor means 4 therefrom, as described above. Thus, swinging of the lever 17 by the operator to the stopped-down diaphragm position shown in phantom lines brings about changing over of the switch S5 to the position for measuring light which travels through the stopped-down diaphragm, and in addition automatic diaphragm stopping down operations will be carried out in a well known manner. Suitable detent structure may be provided for providing click-set operation of the manually operable switch means releasably retaining the lever 17 in either of its positions, namely the fully-open diaphragm position and the stopped-down diaphragm position indicated in FIG. 2. The roller 19 carried by the arm 18 engages the wire 29 of the second transmission means for controlling a releasable retaining means referred to below in a manner described in greater detail.

Thus, the wire 29 is connected at one end to the pin 14b of the swing lever 14 of the second transmission means, as referred to above. The wire 29 is guided around the rollers 27 and 28, with the roller 19 engaging the wire between the rollers 27 and 28. The roller 27 is carried by a swingable lever which is acted upon by a spring so that in this way any slack in the wire 29 will be automatically taken up.

The releasable retaining means which serves in a manner described below to releasably retain the main switch means S1 in its open position after the operator releases the shutter-tripping means 8 for return to its starting position includes a swingable lever 25 supported for swinging movement on a pivot 25a and carrying a pin 26 to which is connected the end of the wire 29 distant from the pin 14b. The pin 26 which is carried by the lever 25 and to which the wire 29 is fixed in this way also serves as a pivot for supporting a lever 23 of the releasable retaining means for swinging movement about a vertical axis parallel to the axis about which the lever 25 turns, this axis being perpendicular to the optical axis. A spring 24 is connected at one end to the arm 23a of the lever 23 and at its opposite end to a pin carried by the lever 25 so as to urge the retaining lever 23 to swing in a counterclockwise direction as viewed in FIG. 2. A spring 32 is operatively connected with the lever 25 for urging the lever 25 to turn also in a counterclockwise direction, as viewed in the drawings, into engagement with a stop member 31. Thus, the spring 32 normally urges the lever 25 into engagement with the stop member 31.

In the position of the part shown in FIG. 2 where the shutter-tripping means 8 is in its starting position, the free end of the arm 20a of the bell crank which forms the lever 20 is situated in front of the free end of the arm 23a of the bell crank which forms the retaining lever 23, so that the retaining lever 23 is prevented in this position from being turned in a clockwise direction by the spring 24. This spring 24 is at this time under tension and seeks to turn the arm 23a beyond the position in which it is held by the arm 20a. As was pointed out above, during the initial part of the downward movement of the shutter-tripping means 8 from its starting toward its shutter-tripping position, the pin 8a swings the lever 20 in a clockwise direction in order to close the main switch means S1, and during an intermediate part of the movement of the shutter-tripping means 8, the pin 8b brings about a change-over of the switches S3 and S4 to connect the capacitor 5 to the control circuit B, and also at this part of the operation the mirror is swung up and the diaphragm is stopped down to the preselected aperture just prior to actual opening of the shutter to initiate the exposure.

The releasable retaining means formed by the components 23-26 responds automatically to closing of the shutter for releasing the switch means S1 to assume again its normally open position. For this purpose there is a rotary disc 33 operatively connected with the trailing curtain of the shutter in such a way that the disc 33 turns in a counterclockwise direction, as indicated by the arrow in FIG. 2, when the shutter closes. This disc 33 carries a pin 34 which engages the arm 23b of the bell crank 23 for turning the latter in a clockwise direction in opposition to the spring 24 so that the lever 23 will again assume the position shown in FIG. 2 and the lever 20 will also again assume the position shown in FIG. 2 in response to closing of the shutter.

FIG. 2 further illustrates a return spring 22 acting on the shutter-tripping means 8 for urging back to its starting position. Also, FIG. 2 shows schematically how the photosensitive means 2 is situated in the interior of the camera behind the objective to receive light after the light has travelled through the objective.

FIG. 3 illustrates how the arm 23a of the releasable retaining means becomes located over the arm 20a of the main switch means in order to maintain the main switch means in its closed position shown in FIG. 3 even after the shutter-tripping means 8 returns to its starting position. Thus, as soon as the pin 8a swings the lever 20 into the position shown in FIG. 3 in order to close the main switch means S1, the lever 23 is turned by the spring 24 to locate the arm 23a over the arm 20a and thus prevent the switch means S1 from opening.

FIG. 4 illustrates how upon closing of the shutter the disc 33 turns to displace the lever 23 in a clockwise direction through the pin 34, thus releasing the switch means S1 to assume again its open position, and of course when the disc 33 returns to the position shown in FIG. 2 the arm 23a will be turned by the spring 24 into engagement with the arm 20a which prevents further turning of the lever 23, the parts now having the position shown in FIG. 2.

FIG. 5 illustrates how the first and second transmission means operate to retract the releasable retaining means 23-26 to a retracted position where it has no influence on the operation of the main switch means S1. Thus, when the first transmission means 13 is returned to its rest position by the spring means 16, the lug 13a swings the lever 14 of the second transmission means away from the stop 30, and this movement is transmitted through the wire 29 to the pin 26 carried by the lever 25, so that the lever 25 is in turn swung around the pivot 25a away from the stop 31 in opposition to the spring 32, and thus the entire releasable retaining means is retracted to the position shown in FIG. 5 where the lever 23 is situated beyond the lever 20 and thus can have no influence on the operation of the main switch means. Under these conditions as soon as the operator releases the shutter-tripping means 8 for return to its starting position, the main switch means S1 will open and the electromagnet 7 will become unenergized so as to automatically terminate the exposure.

Assuming that a fully-open diaphragm type of coupled objective 9 is mounted on the camera and that the manually operable switch means has its lever 17 in the proper fully-open diaphragm position shown in solid lines in FIGS. 2 and 5, then the coupling projection 11 of the diaphragm-selecting ring 10 engages the coupling projection 12 of the first transmission means 13 in order to turn the latter for situating the brush 4a of the variable resistor means 4 at a position where this variable resistor means 4 will introduce into the circuit an electrical quantity corresponding to the selected diaphragm setting. Thus, because of the compensation provided by way of the variable resistor means 4 it is possible to carry out light measurement at the photosensitive means 2 through the fully open diaphragm. Of course, situation of the lever 17 in the fully-open diaphragm position places the manually operable switch means S5 in its position connecting the variable resistor means 4 into the circuit, as shown in FIG. 1, and at the same time the switch S6 is automatically closed because the rear part of the projection 12 no longer engages the normally closed switch S6.

Under these conditions during the initial part of the downward movement of the shutter-tripping means 8, the pin 8a thereof swings the lever 20 of the main switch means so as to close the main switch means S1. A fully open diaphragm light measurement is now carried out and the memory charge stored by the memory capacitor 5 is determined in this way. Further depression of the shutter-tripping means 8 through the middle part of its downward movement causes the pin 8b to act so as to switch pair of switches S3 and S4 over to the position placing the capacitor 5 in connection with the control circuit B, and during this part of the operation the mirror is swung up and the diaphragm is automatically stopped down to the preselected setting. At the final part of the downward movement of the rod 8 the shutter-tripping position is reached so that the shutter opens. Although the operator releases the shutter-tripping means 8 for return to its starting position, the releasable retaining means acts at this time, in the manner shown in FIG. 3, to retain the switch means S1 closed. Thus, the releasable retaining means 23–26 remains at this time in its operating position where it provides the operation shown in FIG. 3. Thus, the switch S1 is automatically maintained in its closed position when the shutter opens and while the shutter remains open. After the automatically determined exposure time has elapsed, the shutter closes since the electromagnet means 7 becomes unenergized, and at this time the disc 33 turns to bring about swinging of the retaining lever 23 to the position of FIG. 4 in the manner described above. As a result the main switch means S1 is released for return to its normal open position, and thus the electrical circuit means of FIG. 1 no longer operates. Therefore, when a fully-open diaphragm type of coupled objective 9 is mounted on the camera, and the manually operable switch means has its lever 17 set in the fully-open diaphragm position, the main switch means S1 will remain closed during the entire time that the shutter remains open, independently of the return of the shutter-tripping means 8 to its starting position. Of course, if the operator should maintain the shutter-tripping means 8 depressed in its shutter-tripping position after the shutter closes, then the switch S1 will open only upon release of the shutter-tripping means 8 by the operator for return to its starting position.

It is of course possible through an oversight that the manually operable switch means will have its lever 17 located in the stopped-down diaphragm position shown in phantom lines in FIG. 2 when a fully-open diaphragm type of coupled objective 9 is attached to the camera. In this event the manually operable switch means S5 no longer connects the variable resistor means 4 into the circuit. Instead this manually operable switch means is in the position it takes for providing a stopped-down diaphragm light measurement circuit, and, as is well known, operation with a stopped-down diaphragm can be carried out by way of the diaphragm ring 10. Because the arm 18 has been swung with the lever 17 to the phantom line position shown in FIG. 2, the roller 19 at this time acts on the wire 29 of the second transmission means to slacken the wire 29 enabling the spring 32 to turn the lever 25 into engagement with the stop 31 if it happens to be located close to the stop 31 but not in engagement therewith. The roller 27 acts to take up the slack, as was pointed out above. Thus, the releasable retaining means 23–26 will still remain in its operating position shown in FIG. 2 even under these conditions, so that the main switch means S1 is operated in the same way as described above. Thus, under these conditions charging of the capacitor 5 will not be influenced by the variable resistor means 4.

Assuming that the fully-open diaphragm type of coupled objective 9 is removed from the camera and replaced by a non-coupled objective and that the operator erroneously leaves the lever 17 in the fully-open diaphragm position shown in solid lines in FIGS. 2 and 5, then the structure will operate in the following manner:

The ring 13 will be returned by the spring 16 to the rest position shown in FIG. 5 so that the lug 13a of the first transmission means formed by the ring 13 will swing the lever 14 of the second transmission means to the position of FIG. 5, thus pulling on the wire 29 of the second transmission means in order to retract the releasable retaining means 23–26 into its retracted position shown in FIG. 5 where it will have no further influence on the main switch means S1. Under these conditions the main switch means S1 will be first closed and then opened upon depression and release of the shutter-tripping means 8, respectively. Therefore, when the operator erroneously depresses the shutter button with the non-coupled type of objective attached to the camera and with the manually operable switch means in the fully-open diaphragm position, the equivalent of a bulb exposure is made rather than a time exposure. In other words the duration of the exposure is determined by the time during which the operator maintains the shutter-tripping means 8 depressed. As soon as the operator releases the shutter-tripping means 8 the switch means S1 will automatically open under these conditions so as to terminate the exposure.

If, however, a non-coupled type of objective replaces the objective 9 and the operator has correctly displaced the manually operable switch means so that its lever 17 is in the stopped-down diaphragm position shown in phantom lines in the drawings, then the operations is as follows:

The roller 19 of the manually operable switch means will act on the wire 29 of the second transmission means to slacken the wire so that the spring 32 can still maintain the lever 25 in engagement with the stop 31, thus maintaining the releasable retaining means in its operating position even though the lever 14 has been turned to the position of FIG. 5 by the first transmission means 13. Thus, the releasable retaining means will be fully operative under these conditions, in the same manner as described above in connection with the fully-open diaphragm type of objective 9, and the depression of the shutter-tripping means 8 will bring about closing of the switch means S1 with the opening thereof being determined by closing of the shutter rather than by release of the shutter-tripping means 8. Of course, under these conditions the non-coupled objective may be automatically stopped down either manually before the shutter-tripping means 8 is depressed in order to initiate an exposure, so that light measurement by the photosensitive means 2 is made only through the stopped-down objective, or the non-coupled type of objective may be one which is automatically stopped down prior to closing of the main switch means S1 in order to energize the photosensitive means 2, so that in either case the light measurement will be made only through the stopped-down diaphragm, thus achieving a proper exposure with the variable resistor means 4 disconnected from the circuit.

With conventional cameras the arrangement is such that when the light measurement change-over means remains set in the position for fully-open diaphragm light measurement and the user erroneously depresses the shutter button with a non-coupled type of objective connected to the camera, a warning is given by way of the action of the non-connection circuit and the shutter will carry out a time exposure. In accordance with the present invention, however, a considerable advantage is achieved in that under these circumstances the releasable retaining means is rendered inactive and the opening and closing of the main switch means is carried out directly in response to operation of the shutter-tripping means. Therefore inadvertent depression of the shutter-tripping means under these conditions will only result in a bulb exposure, so that the excessive power consumption resulting from a time exposure is avoided and in addition the bulb exposure action of the shutter will warn the operator immediately that there has been an erroneous operation, so that the operator is warned earlier with the present invention than with conventional systems.

With electrical shutter-control systems of the type shown in FIG. 1, power is consumed primarily at the shutter-controlling electromagnet means 7. Therefore, in addition to the above-described embodiment of the invention, it is possible to provide other arrangements which will achieve the advantages of the invention. Thus, while with the above-described embodiment of the invention, the releasable retaining means is retracted so as to have no effect on the main switch means S1, thus achieving opening of the latter when the operator releases the shutter-tripping means 8 for return to its starting position, it is also possible to have circuitry in addition to that described above for achieving substantially the same result. It is possible in accordance with the invention to provide other embodiments where the second transmission means formed by the wire 29 is eliminated so that the releasable retaining means remains at all times in its operating position, and instead upon return of the shutter-tripping means 8 toward its starting position either the electromagnet means 7 or the switching circuit means C is short-circuited in the event that the manually operable switch means S5 has its lever 17 in the fully-open diaphragm position when in fact a non-coupled diaphragm is attached to the camera.

Figure 6:
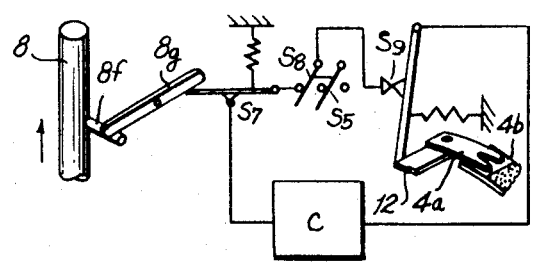
FIG. 6 is a schematic illustration of another embodiment of a structure according to the invention.

Thus, referring to FIG. 6, it will be seen that according to this embodiment of the invention, the releasable retaining means 23–26 may remain at all times in its operating position, and instead the shutter-tripping means 8 is provided with an additional pin 8f projecting radially therefrom. This pin 8f is adapted to swing the schematically illustrated lever 8g in a clockwise direction, as viewed in FIG. 6, for closing a switch S7 when the shutter-tripping means 8 returns to its starting position illustrated in FIG. 6. The switch S7 is connected in series with a switch S8 which is coupled with the switch S5 so as to operate in unison therewith. Thus, the switch S8 is closed when the switch S5 is in the fully-open diaphragm position, connecting the variable resistor means 4 into the circuit. When the switch S5 is moved to the stopped-down diaphragm position the switch S8 is opened. This switch S8 is in turn connected in series with a switch S9 which is situated beside the switch S6. The switch S9 is a normally open switch, and this switch is closed by the rear portion of the projection 12 when a non-coupled objective is connected to the camera. Thus, as was described above the spring 16 will turn the ring 13 to the position of FIG. 5 when a non-coupled objective is mounted on the camera, and with the embodiment of FIG. 6 the projection 12 will close the switch S9 while simultaneously opening the switch S6. The series-connected switches S7, S8, and S9 are all connected in series with the switching circuit means C, so that with the parts in the position of FIG. 6 the switching circuit means C will be short-circuited, thus bringing about deenergizing of the electromagnet means 7 upon return of the shutter-tripping means 8 to its starting position shown in FIG. 6. Of course, if a fully-open diaphragm type of coupled objective 9 is mounted on the camera, the switch S9 will be in its normally open position preventing operation of the circuit shown in FIG. 6, while if with a non-coupled objective on the camera the manually operable switch means is properly positioned in the phantom-line position shown in FIGS. 2 and 5, the switch S8 will be opened, thus preventing operation of the circuit of FIG. 6 also under this latter condition.

However, if a non-coupled objective is mounted on the camera with the manually operable switch means remaining in the fully-open diaphragm position shown in solid lines in FIGS. 2 and 5, then the switches S8 and S9 will both be closed, so that immediately upon return of the shutter-tripping means 8 to the starting position the switch S7 will also close, thus short-circuiting the switching circuit means C to terminate the exposure. At this time the releasable retaining means, although it remains in its operating position to hold the main switch means closed in the manner shown in FIG. 3, will be acted upon by the closing of the shutter, by way of the disc 33 and the pin 34 as described above in connection with FIG. 4, in order to immediately release the main switch means to assume its open position upon closing of the short-circuiting switch S7. Therefore wtih this structure also it is possible to achieve the results of the invention described above.

Figure 7:
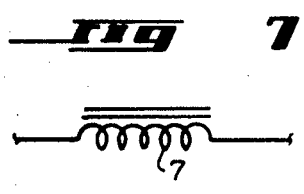
FIG. 7 is a fragmentary illustration of an electromagnet which may replace a switching circuit of FIG. 6 in accordance with a third embodiment of the invention.

With the embodiment of FIG. 7 the circuitry is the same as that of FIG. 6 except that the electromagnet means 7 is located in the position of the switching circuit means C, so that it is the coil of the electromagnet means 7 which is short-circuited under the conditions described above in connection with FIG. 6. This action also will result in release of the shutter to assume its closed position, thus bringing about the operation shown in FIG. 4 on the releasable retaining means, so that the switch S1 will automatically assume its open position as soon as the shutter-tripping means 8 returns to its starting position. Therefore, with these embodiments also it is possible to provide the equivalent of a bulb exposure when the lever 17 of the manually operable switch means S5 remains in the fully-open diaphragm position when a non-coupled diaphragm is mounted on the camera.

What is claimed is:

1. In a single lens reflex camera adapted to use interchangeable objectives of the coupled and non-coupled type, and having a photosensitive means for measuring light after the light has travelled through a selected objective which is mounted on the camera, manually operable shutter-tripping means movable by the operator from a starting position to a shutter-tripping position and automatically returning to said starting position when released by the operator, electrical circuit means electrically connected with said photosensitive means for automatically determining the exposure time, said electrical circuit means including a main switch means having with respect to said shutter-tripping means a position which closes said main switch means and thus said electrical circuit means for energizing the latter upon movement of said shutter-tripping means away from said starting position thereof toward said shutter-tripping position thereof, releasable retaining means coacting with said main-switch means for retaining the latter in its closed position after said shutter-tripping means is released for return to its starting position until the shutter closes, said releasable-retaining means responding automatically to closing of the shutter for releasing said main switch means for return to its open position, said electrical circuit means further including a variable resistor means for coacting with a coupled objective to introduce into said electrical circuit means a resistance value in accordance with a preselected diaphragm setting when a coupled objective is mounted on the camera, manually operable switch means forming part of said electrical circuit means and having a fully-open diaphragm position connecting said variable resistor means into said electrical circuit means in series with said photosensitive means and a stopped-down diaphragm position connecting said photosensitive means into said electrical circuit means while disconnecting said variable resistor means from said electrical circuit means, and control means for automatically opening said main switch means to terminate operation of said electrical circuit means upon release of said shutter-tripping means for return to its starting position in the event that said manually operable switch means has not been displaced to its stopped-down diaphragm position when a non-coupled objective is mounted on the camera, so that in the latter event the equivalent of a bulb exposure is made.

2. The combination of claim 1 and wherein said releasable retaining means is movable between an operating position coacting with said main switch means and a retracted position where said releasable retaining means has no effect on said main switch means, said control means coacting with said releasable retaining means for automatically retracting the latter to said retracted position thereof when a non-coupled objective is mounted on the camera and said manually operable switch means is in said fully-open diaphragm position thereof, said manually operable switch means coacting with said control means for maintaining said releasable retaining means in said operating position thereof when a non-coupled objective is mounted on the camera and said manually operable switch means is displaced to said stop-down diaphragm position thereof.

3. The combination of claim 2 and wherein a first motion-transmitting means is operatively connected with said variable resistor means for automatically setting the latter at a position corresponding to the position of an aperture selecting ring of a coupled objective when the latter is mounted on the camera, spring means operatively connected with said first motion-transmitting means for returning the latter to a predetermined rest position when a non-coupled objective is mounted on the camera, and second motion-transmitting means actuated by said first motion-transmitting means upon return of the latter to said rest position thereof and operatively connected with said releasable retaining means for automatically retracting the latter to said retracted position thereof in response to movement of said first motion-transmitting means to said rest position thereof, said manually operable switch means coacting with said second transmission means for acting on the latter to maintain said releasable retaining means in said operating position thereof when said first motion-transmitting means returns to said rest position thereof and acts on said second motion-transmitting means.

4. The combination of claim 3 and wherein said releasable retaining means is swingably mounted for movement between said operating and retracted positions, said second motion-transmitting means including a swingable lever and a wire extending between said swingable lever and said releasable retaining means, said first motion-transmitting means including a rotary ring having a lug which acts on said swingable lever to act through the latter on said wire for retracting said releasable retaining means to said retracted position thereof, said manually operable switch means including a lever having an arm operatively connected with said wire for acting through the latter on said releasable retaining means for maintaining the latter in said operating position thereof even when said swingable lever is acted upon by said lug of said first motion-transmitting means.

5. The combination of claim 1 and wherein said electrical circuit means includes an electromagnet means for retaining a camera shutter in its open position while said electromagnet means is energized and for releasing the camera shutter to close when said electromagnet means is unenergized, said electrical circuit means including as part thereof a switching circuit means electrically connected with said electromagnet means for deenergizing the latter after an exposure time determined by said electrical circuit means has elapsed, said releasable-retaining means responding to closing of the shutter for releasing said main switch means for return to its open position, said switching circuit means and electromagnet means forming a pair of means at least one of which is electrically connected with said control means, and said control means including a switch means which automatically closes in response to return of said shutter-tripping means toward said starting position thereof for short-circuiting said one of said pair of means to deenergize said electromagnet means and thus permit the shutter to close for opening said main switch means.

6. The combination of claim 5 and wherein said one of said pair of means is said electromagnet means.

7. The combination of claim 5 and wherein said one of said pair of means is said switching circuit means.

* * * * *